INVENTOR.
Charles W. Bergman

Dec. 14, 1965 C. W. BERGMAN 3,223,174
POWER DRIVEN EARTH WORKING TILLERS AND TRACTORS AND THE LIKE
Filed April 14, 1964 6 Sheets-Sheet 2
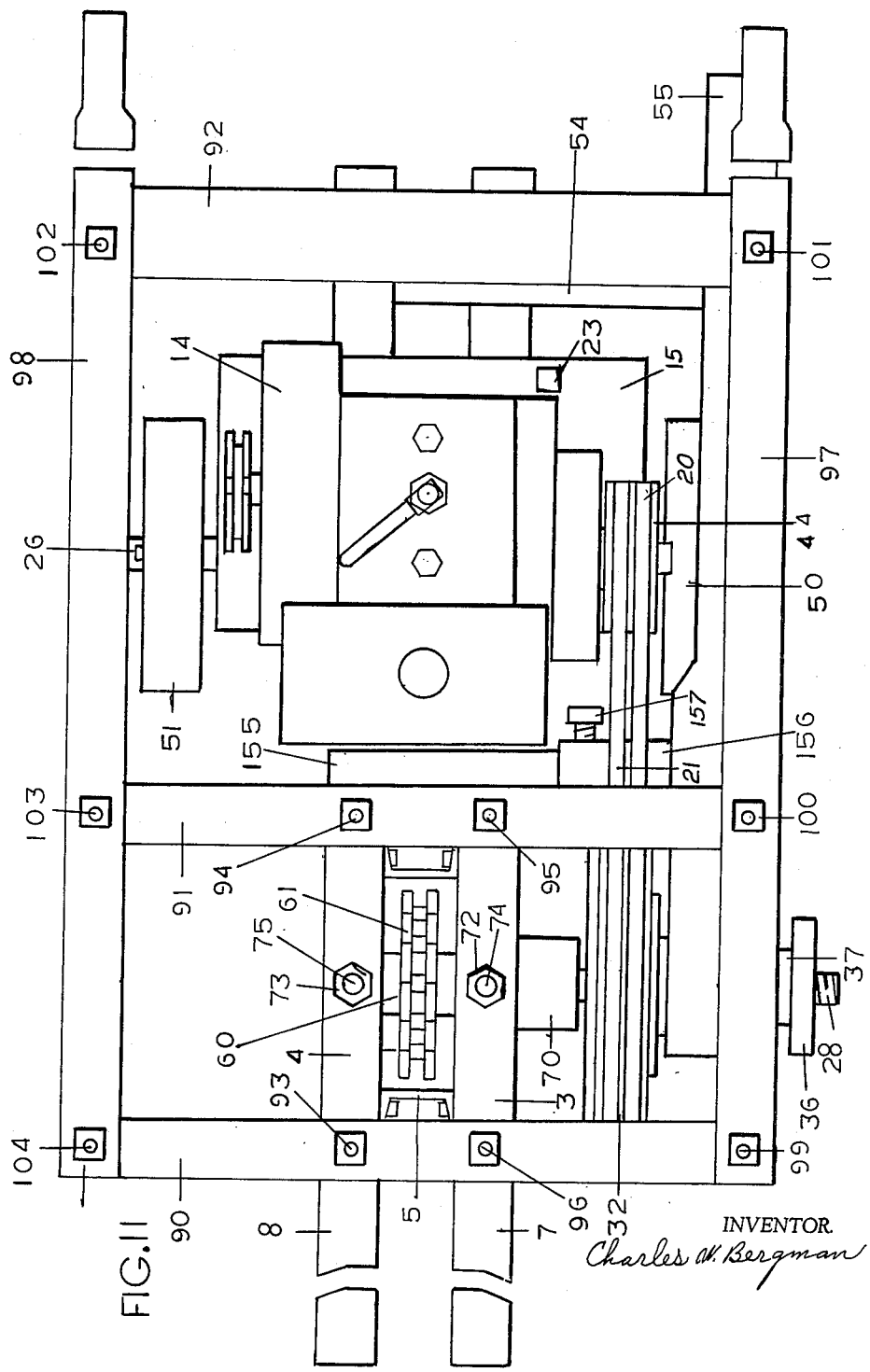
INVENTOR.
Charles W. Bergman

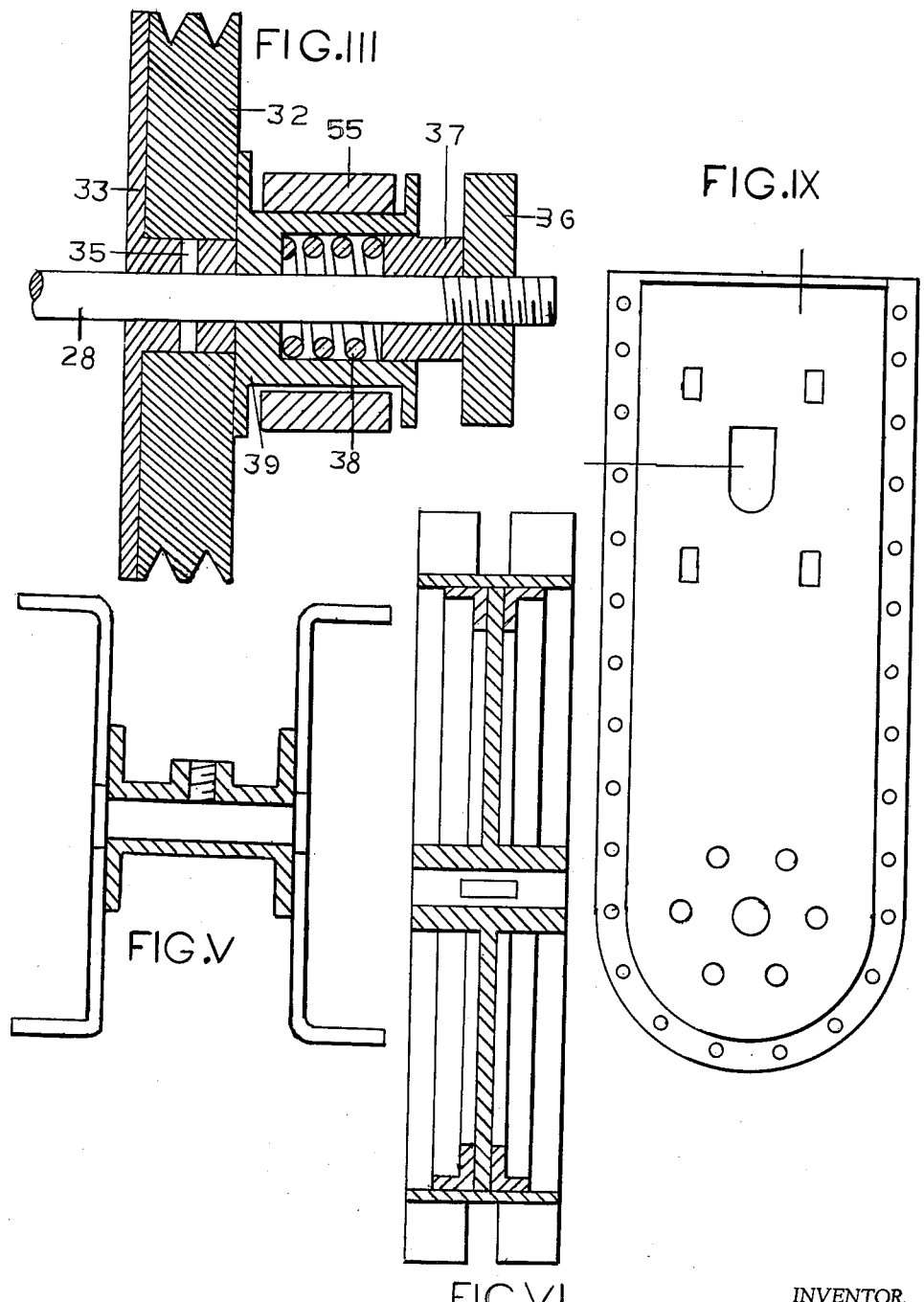

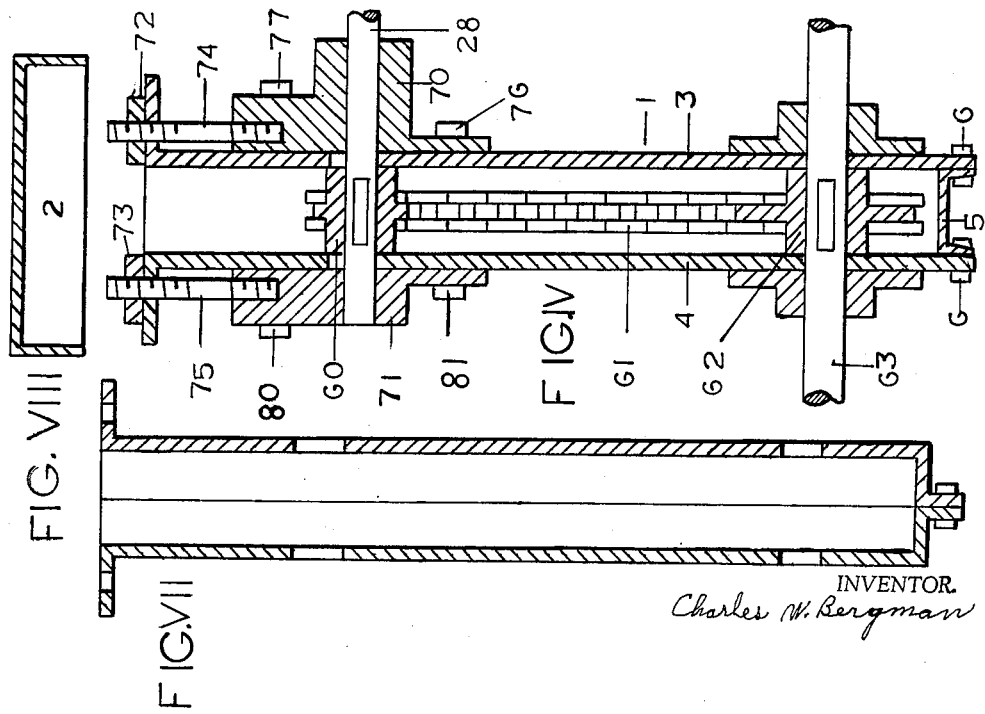

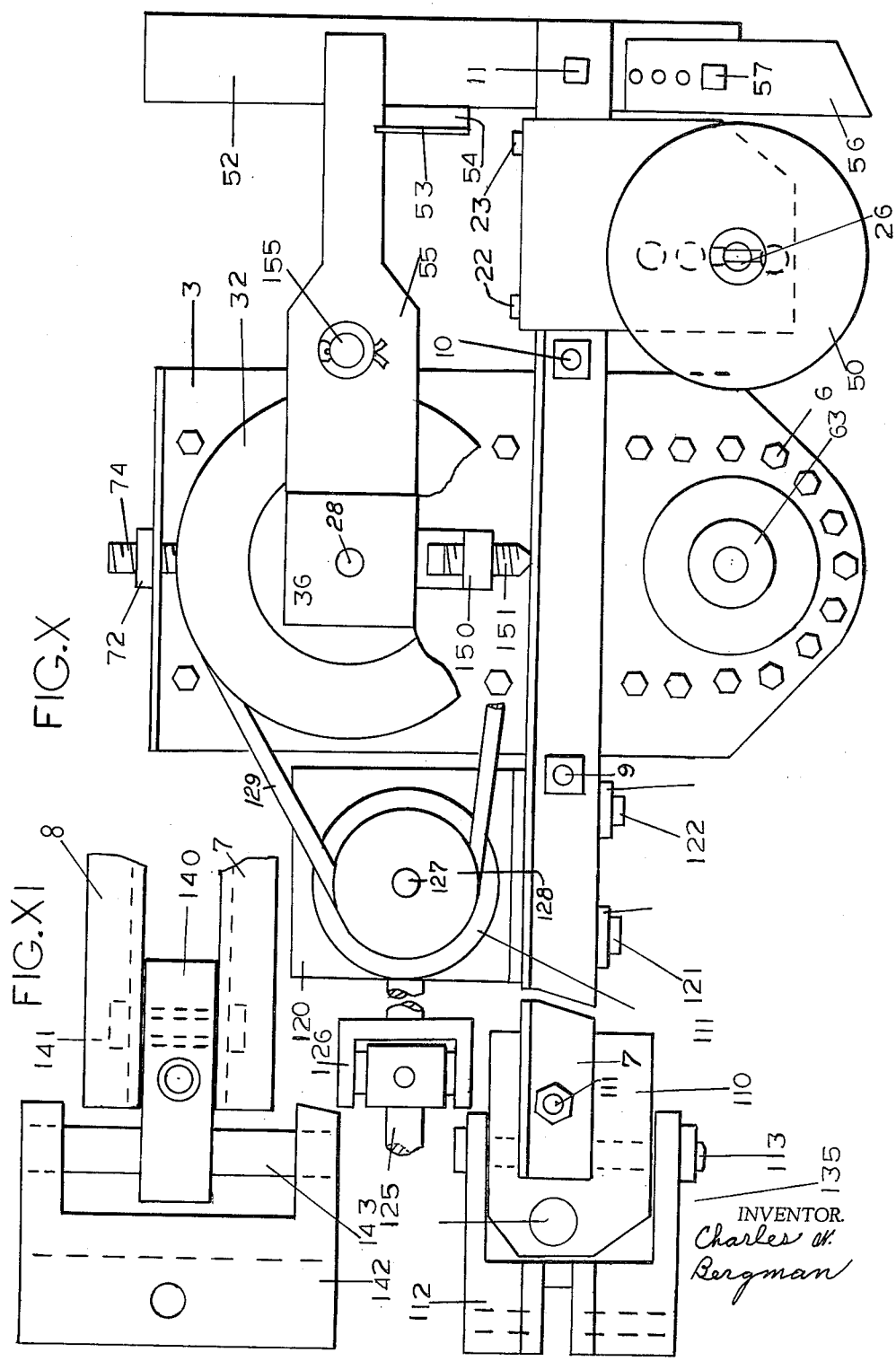

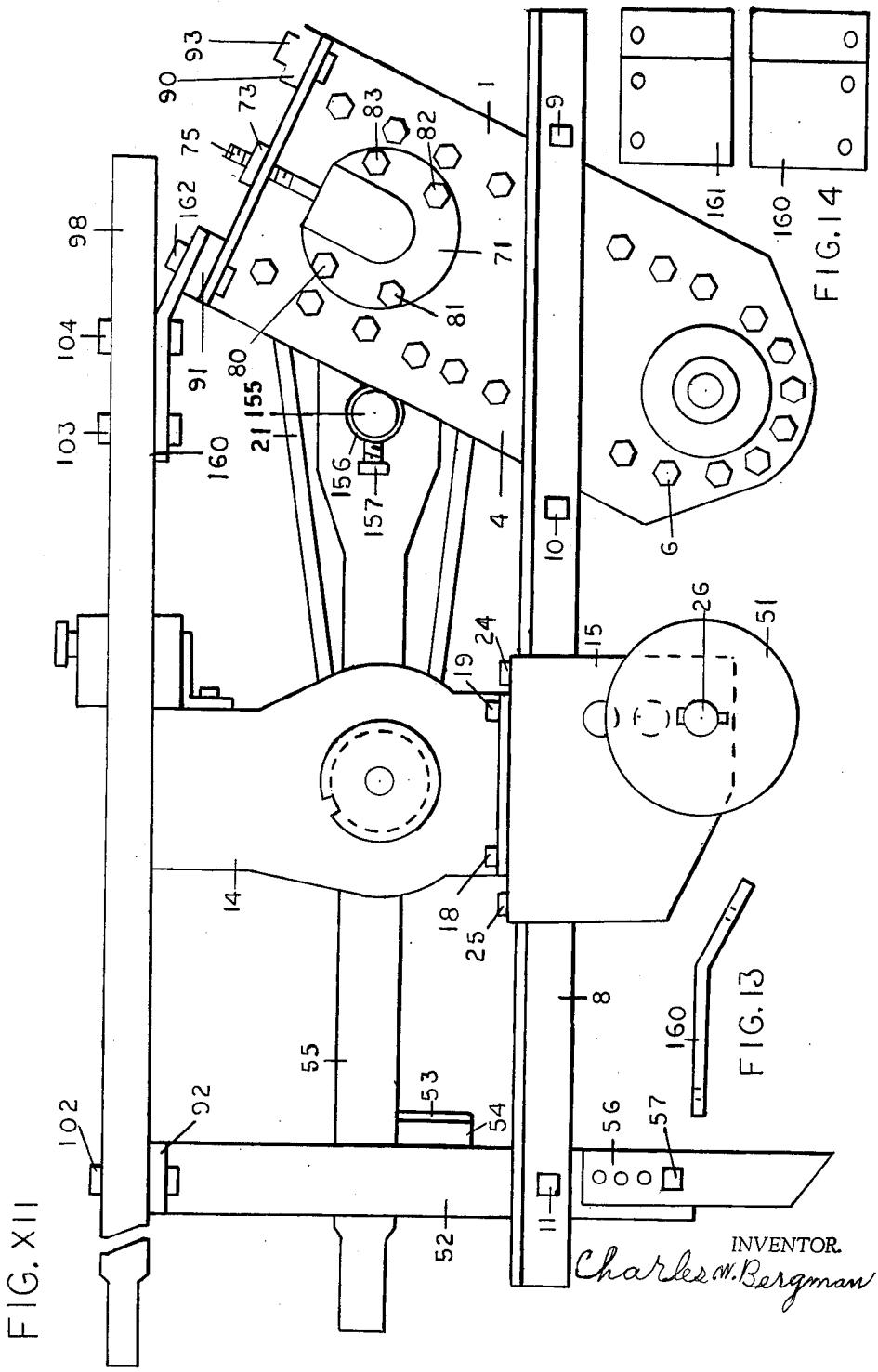

United States Patent Office 3,223,174
Patented Dec. 14, 1965

3,223,174
POWER DRIVEN EARTH WORKING TILLERS
AND TRACTORS AND THE LIKE
Charles W. Bergman, R.R. 2, Grand Rapids, Mich.
Filed Apr. 14, 1964, Ser. No. 359,750
1 Claim. (Cl. 172—43)

This invention relates to power driven earth working tillers and tractors and the like that have their own power units and to tillers without power units which can be attached to a tractor or the like as a trailing tiller and receive power from the tractor or the like and more particularly to an improved transmission chain drive housing for transmitting power therein.

Other chain drive tillers and tractors have these and other faults:

(1) There is no way or means for the operator to see or know quickly how much, if any, oil is in chain drive housing or to see if chain is too loose or worn too much.

(2) There is no way in other tillers and tractors and the like to remove worn chain or chains and sprockets from the power transmission chain drive housing or to put in new chain or chains and sprockets without taking transmission chain drive housing apart.

(3) There is no way or means in other tillers and tractors to adjust chain or chains tension or to tighten chain or chains when chains wear and become elongated or stretched.

(4) There is no safety release clutch to prevent damage or breakage to the mechanical parts when a solid obstruction is encountered.

One object of this invention is to provide an improved power transmission chain drive housing with an open top and power transmission means for earth working tillers and tractors and the like in which the operator can:

(1) See quickly if there is enough oil in chain drive housing wherein the chain, sprockets and bearings run.

(2) Through the open top of the power transmission chain drive housing see and feel quickly if the chain is worn enough to need replacement.

(3) Through open top of chain drive housing connecting link in chain can be removed and worn chains and sprockets can be removed and new chain and sprockets be put into chain drive housing through the open top of housing without taking chain drive housing apart.

Another object of this invention is to provide means in top end of drive housing to adjust tension of chains.

Another object of this invention is to provide an improved earth working tiller without a power unit of its own which can be attached to a tractor or the like as a trailer and receive the power to drive the tilling blades from the tractor to which tiller is attached.

Another object of this invention is to provide a friction clutch that acts as a starting clutch and a safety release clutch which prevents damage to or breakage to the machine parts when an obstruction is hit.

Another object of this invention is to provide an earth working tiller and tractor which may be converted to either by interchanging some of its parts.

This invention has other objects and features of advantage, some of which with the foregoing will be set forth in the following description of the preferred form of the invention which is illustrated in the drawings accompanying and forming part of the specifications.

It is to be understood, however, that variations in the showing made by said drawings and descriptions may be adapted within the scope of the invention as set forth in the claims.

These and other objects and advantages of the present invention will become apparent from the following description and the drawings in which:

FIG. 2 is a top plan view of the tiller and tractor shown in FIG. 1.

FIG. 3 is a cross-sectional view of the starting and safety release clutch.

FIG. 4 is a cross-sectional view of the transmission chain drive housing from top to bottom through the center of sprockets of said chain drive housing.

FIG. 5 shows one tiller tine assembly.

FIG. 6 is a cross-sectional view of a tractor wheel.

FIG. 7 is a cross-sectional view of the transmission chain drive housing when made up of two case halves each peripherally flanged and shallow dished with the flanges bolted together.

FIG. 8 shows a cover for top of transmission chain drive housing.

FIG. 9 is a side view of one-half of the transmission chain drive housing when made up of two case halves each peripherally flanged and shallow dished with the flanges bolted together.

FIG. 10 is a side view of the tiller which can be attached to a tractor or the like as a trailing tiller and receive the power from the tractor to turn the tilling tines of the tiller.

FIG. 11 is another attachment for attaching the tiller to a tractor.

FIG. 12 is a side elevation of the earth working tiller showing the power transmission chain drive housing tilted forward of a vertical position.

FIG. 13 is a side view of a bent plate used to fasten front end of handles to top of chain housing when said chain housing is tilted forward of a vertical position.

FIG. 14 is a top view of same plate.

Figure 1:
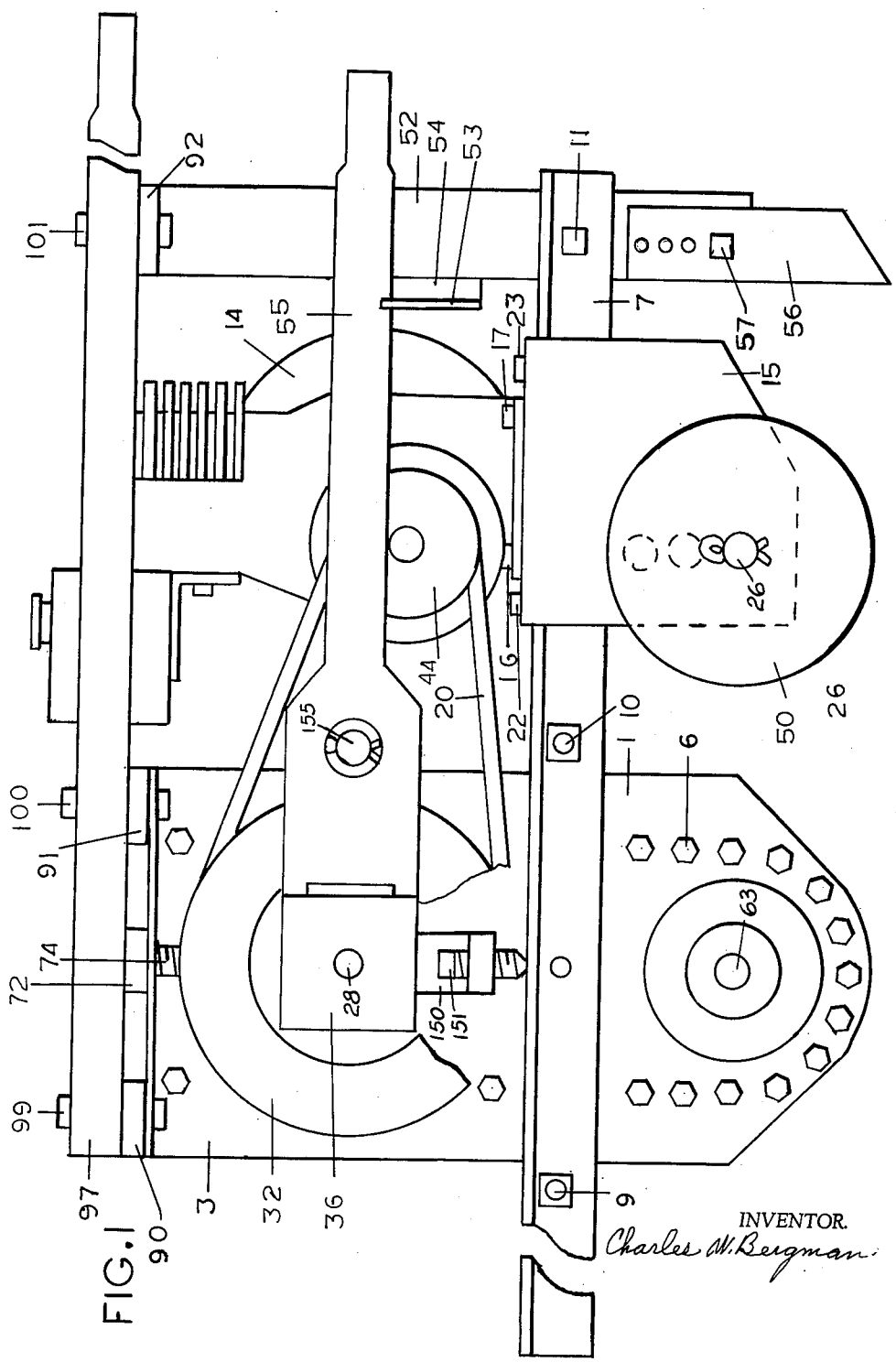
FIG. 1 is a side elevation of one embodiment of the earth working tiller and tractor of the present invention.

In FIGS. 1 and 2 the side view of my improved earth working tiller and tractor there is shown the rigid power transmission chain drive housing with an open top with the cover 2 (FIG. 8) removed which is made up of two plates 3, 4 and a standard width channel iron 5 bent to proper form and bolted together with many small bolts 6 and rigidly secured between the two longitudinal angle iron frame members 7, 8 by the three bolts 9, 10, 11. The power transmission drive housing 1 may also be made up of two case halves with an open top (FIG. 7) each peripherally flanged and shallow dished with the flanges being bolted together without departing from the spirit of the invention. The power unit 14 (FIG. 1) is a standard internal combustion engine with a 6 to 1 reduction gear built into side of engine when desired. The power unit 14 is bolted to the movable inverted U-shaped piece 15 rearwardly of the chain drive housing 1 by the bolts 16, 17, 18, 19. The movable inverted U-shaped piece 15 rests on top of the two angle iron frame members 7, 8 and is movable rearward to tighten belts 20, 21 and held rigidly in place by the bolts 22, 23, 24, 25. 26 is an axle shaft passing through two holes in the lower ends of the inverted U-shaped piece 15. Two support wheels 50, 51 are mounted on ends of axle 26. 52 is a vertical frame member secured rigidly between the rear ends of the two longitudinal frame members 7, 8 by the bolt 11. 54 is a horizontal piece which supports the rear end of clutch handle 55, its inner end secured rigidly to the vertical frame member 52, its outer end having the boss 53 over which the clutch lever 55 is hooked when clutch is out of gear. Secured to the lower end of vertical frame member 52 is a brake tooth 56 demountably fastened by the bolt 57. Brake tooth 56 has several holes in it it can be set at various depths. In FIG. 4, the parts 70, 71 with flange and hub in which drive shaft 28 is mounted are moved upward to tighten chain 61 in power transmission chain drive housing 1 by turning the nuts 72, 73 on the threaded studs 74, 75 and then securing the flanged members 70, 71 rigidly to the sides of the upper end of said chain drive housing 1 by the bolts 76, 77, 80, 81, 82, 83 which move in oblong holes or slots in said drive housing 1. Only the bolts 76, 77 and 80, 81 are shown in FIG. 4. In FIGS. 1 and 2, 90, 91 are two cross pieces secured to the top of drive housing 1 by the bolts 93, 94, 95, 96. A cross piece 92 is rigidly secured to the vertical frame member 52. Rearwardly extending handles 97, 98 secured to the cross pieces 90, 91, 92 by the bolts 99, 100, 101, 102, 103, 104 provide means for controlling the forward travel of the tiller or tractor. In FIG. 1 the boss 150 is rigidly secured to the outer side of the transmission chain drive housing 1. A screw 151 passing through the boss 150 acts as a pivot if the said chain drive housing 1 is tilted forwardly of a vertical position or tilted rearwardly of a vertical position and secured rigidly between the two frame members 7, 8 by the bolts 9, 10, 11. In FIGS. 1 and 2 the rod 155 is rigidly secured to the rear side of the drive housing 1 and acts as the main support for the clutch lever 55. The proper position on the rod 155 of the clutch lever 55 is obtained by adjusting the movable sleeve 156 to the proper place on the rod 155 and securing the sleeve 156 in place by the set screw 157.

Power is transmitted from the power unit pulley 44 by the two V belts 20, 21 to the friction clutch pulley 32. In FIG. 3, 33 is a friction clutch plate with hub keyed to the drive shaft 28 by the pin 35. The entire power of the power unit 14 is transmitted to the drive shaft 28 journal mounted in upper end of chain drive housing 1 when by turning the clutch spring 38 tension pressure adjusting nut 36 on end of threaded drive shaft 28 thus forcing the movable bushing 37 against the clutch spring 38 inside the clutch yoke 39 thus forcing the friction clutch pulley 32 against clutch face plate 33 keyed to the drive shaft 28 by the pin 35. FIG. 3 shows clutch in an "in gear" position. By turning the spring pressure adjusting nut 36 to give the proper pressure to clutch spring 38 the friction clutch also acts as a safety clutch— slipping when an obstruction is encountered by the tilling tines or tractor thus preventing damage to machine parts. As shown in cross-sectional view in FIG. 4 of the chain, sprockets and shafts and drive housing 1, 60 is a sprocket keyed to drive shaft 28 journal mounted in upper end of drive housing 1. A chain 61 transmits power, at a reduced speed, from the sprocket 60 to the sprocket 62 keyed to the driven shaft 63 journal mounted in the lower end of the chain drive housing 1. An earth working assembly of tines, FIG. 5, when used as a tiller and tractor wheel, FIG. 6, when used as a tractor are mounted and secured on each end of drive shaft 63 in lower end of drive housing 1. In FIG. 10, 135 is a tiller to tractor hitch mounted to front end of tiller frame with the part 110 secured between the two frame members 7, 8 by the bolt 111 which provides means for attaching tiller to rear end of a tractor or the like when the tiller is used as a trailing tiller and receives the power needed to turn the earth working tilling tines from the tractor to which said tiller is attached. The hitch member 112 is secured to the hitch member 110 by the bolt 113 which passes through hitch member 110 thus also allowing the trailing tiller to move to either side when tractor turns corners. The tiller to tractor hitch member 112 may be secured to a tractor, or the like, drawbar by passing a pin through the holes in hitch member 112 and through a hole in the drawbar of tractor. FIG. 11 shows another type of tiller to tractor hitch in which the hitch member 140 is secured between the front ends of the two tiller frame members 7, 8 by the bolt 141. Hitch member 142 is secured to the hitch member 140 by the pin 143. A gear drive housing 120 is secured to the frame members 7, 8 by the bolts 121, 122. A propeller shaft 125 with a universal joint 126 is journal mounted in the front end of said gear drive housing 120. A drive shaft 127 is journal mounted in the left hand side of said gear housing 120. A pulley 128 is mounted on the outer end of the said drive shaft 127. Bevel gears are mounted on the drive shafts inside the gear housing 120. When tiller is used as a trailing tiller, power is transmitted from the tractor or the like to which tiller is attached through the propeller shaft 125 and universal joint 126 and gears in the gear housing 120 to pulley 128 at side of said gear drive housing 120. Power is transmitted from the pulley 128 by a belt 129 to the pulley 32 mounted in the friction and safety release clutch mounted on the drive shaft 28 in the upper end of the tiller power transmission chain drive housing 1.

In FIGURE 12 the power transmission chain drive housing 1 is shown tilted forward of a vertical position and secured rigidly between the two frame members 7, 8 by the bolts 9, 10. Referring to FIGURES 1, 2, 12, the housing 1 can be easily and quickly tilted forward of a vertical position by loosening slightly the nuts on bolts 9, 10 then removing bolts 99, 100, 103, 104 from the handles 97, 98. The bolts 9, 10 do not pass through the housing 1 but are spaced at proper distance from the edge of housing 1 so that housing 1 can be tilted forward or rearward, the end of the screw 151 in the boss 150 acting as a pivot. The screw 151 can be turned to raise or lower the housing 1. Then the bolts 9, 10 are tightened to secure the housing 1 rigidly between the frame members 7, 8. Longer belts are used to transmit power from the power unit 14 to the clutch pulley 32 when the transmission chain drive housing 1 is tilted forward of a vertical position as shown in FIGURE 12. After the housing 1 is tilted to and fixed in the position desired by tightening the bolts 9, 10, the front end of the right handle 98 is fastened rigidly to the right hand end of the cross piece 91 on top of the chain drive housing 1 by fastening one end of the bent plate 160 (FIGURES 13 and 14) to the handle 98 with the bolts 103, 104 and fastening the other end of bent plate 160 to the right hand end of the crosspiece 91 with the bolt 162. The front end of the left hand handle 97 is fastened rigidly to the left hand end of the cross piece 91 on top of the chain drive housing 1 by bolting the bent piece 161 to the left hand handle 97 and fastening the other end of the bent plate 161 to the left hand end of the cross piece 91.

Having thus described my invention, I claim:

A power driven earth working tiller comprising, a frame having a pair of laterally spaced longitudinal frame members, said frame members having flat inside opposed faces, a narrow flat sided substantially vertical transmission housing located between said frame members, means mounting said housing on said frame members so that the housing can be tilted forwardly or rearwardly about a transverse pivot axis, the upper part of said drive housing extending above said pair of frame members, sprocket and chain drive means located within said housing, the top of said housing having an opening sufficient in size so that the sprocket and chain drive means can be inspected and removed, the lower end of said housing depending below said pair of frame members, a transversely extending shaft journaled in the lower end of said housing, a transverse drive shaft journaled in the upper end of said housing, said sprocket and chain drive means drivingly interconnecting said shafts, a manually operable safety release clutch means mounted on said upper shaft adjacent said housing, spring means in said clutch means operable to release said clutch on overload, means for adjusting said spring means rotatably mounted on the end of said upper shaft, a power unit mounted rearwardly of said housing on said pair of frame members, reduction drive means for transmitting power at a reduced speed from said power unit to said clutch means, manually operable means including a handle pivotally mounted on said housing for actuating said clutch means, detent means on said frame to locate said handle in both operative and inoperative position, earth working tiller tines mounted on said lower shaft on opposite sides of said housing, adjustable means in the upper end of said housing to position said upper shaft so as to tension said chain means, said adjustable means comprising a pair of flanges rotatably mounting said upper shaft, screw means extending through the upper portion of said housing adjacent said opening and extending downwardly into said flanges, bolt and slot means adjustably mounting said flanges on said housing, ground engaging wheels mounted on the rearward portion of said frame, means for adjustably mounting said wheels, handle means mounted on said frame and extending rearwardly of said frame, brake tooth means adjustably mounted on the frame rearwardly of said wheels, said tooth means extending rearwardly and downwardly and adapted to be urged in the ground by downward pressure on the handle means.

References Cited by the Examiner

UNITED STATES PATENTS

| 1,795,029 | 3/1931 | Kimball | 172—103 X |
| 2,661,584 | 12/1953 | Ronning | 172—42 X |
| 2,679,794 | 6/1954 | Ober | 172—42 X |
| 2,803,183 | 8/1957 | Smithburn | 172—43 |
| 2,886,113 | 5/1959 | Sorensen et al. | 172—44 X |
| 3,072,198 | 1/1963 | Calkins et al. | 172—44 |

FOREIGN PATENTS

| 523,154 | 4/1931 | Germany. |
| 298,119 | 10/1928 | Great Britain. |
| 543,940 | 3/1956 | Italy. |

ABRAHAM G. STONE, *Primary Examiner.*

F. B. HENRY, *Assistant Examiner.*